(12) United States Patent
Humburg

(10) Patent No.: US 9,616,730 B2
(45) Date of Patent: Apr. 11, 2017

(54) HEAT EXCHANGER ARRANGEMENT, ESPECIALLY FOR A VEHICLE HEATER

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 621 days.

(21) Appl. No.: 14/078,888

(22) Filed: Nov. 13, 2013

(65) Prior Publication Data

US 2014/0131461 A1    May 15, 2014

(30) Foreign Application Priority Data

Nov. 14, 2012    (DE) .................... 10 2012 220 792

(51) Int. Cl.
| | | |
|---|---|---|
| *B60H 1/22* | (2006.01) | |
| *F28D 7/10* | (2006.01) | |
| *B60H 1/03* | (2006.01) | |
| *B64D 13/08* | (2006.01) | |
| *F28D 7/12* | (2006.01) | |

(Continued)

(52) U.S. Cl.
CPC ......... *B60H 1/2212* (2013.01); *B60H 1/2209* (2013.01); *F28D 7/103* (2013.01); *B60H 2001/2271* (2013.01); *F24H 1/124* (2013.01); *F24H 3/087* (2013.01); *F28D 7/12* (2013.01);
(Continued)

(58) Field of Classification Search
CPC .... B60H 1/2212; B60H 1/2209; B60H 1/032;
B60H 1/2203; B60H 1/00314; B60H 2001/2271; F28D 7/103; F28D 7/12; F28D 2021/0096; F28F 9/02; B64D 13/08;
(Continued)

(56) References Cited

U.S. PATENT DOCUMENTS

| | | | | |
|---|---|---|---|---|
| 540,028 | A * | 5/1895 | Roelker | .................... F28D 7/12 |
| | | | | 165/142 |
| 2,362,985 | A * | 11/1944 | Brown, Jr. | .............. F28F 9/013 |
| | | | | 165/140 |

(Continued)

FOREIGN PATENT DOCUMENTS

| | | |
|---|---|---|
| CN | 86106537 A | 4/1987 |
| CN | 102642455 A | 8/2012 |

(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A heat exchanger arrangement, especially for a vehicle heater, includes a pot-like heat exchanger housing (12) extending in the direction of a longitudinal axis (L) of the housing. The heat exchanger housing includes an outer housing part (14) with the outer circumferential wall (18) and with an outer bottom wall (20) as well as an inner housing part (16) with the inner circumferential wall (22) and with an inner bottom wall (24). A heat carrier medium flow connecting piece (50, 52), open towards the heat carrier medium flow space, is provided at an axial end area (44) of the outer circumferential wall of the outer housing part, the end area being located at a distance from the outer bottom wall. A waste gas flow connecting piece (30) is open towards an interior space (26) of the heat exchanger housing, which interior space is enclosed by the inner wall.

19 Claims, 3 Drawing Sheets

(51) Int. Cl.
*F24H 3/08* (2006.01)
*F24H 1/12* (2006.01)
*F28F 9/02* (2006.01)
*F28D 21/00* (2006.01)

(52) U.S. Cl.
CPC ........ *F28D 2021/0096* (2013.01); *F28F 9/02* (2013.01)

(58) Field of Classification Search
CPC .......... B64D 37/34; B64D 2700/62973; F24H 1/124; F24H 3/087
USPC ............... 237/12.3 C, 12.3 B, 36, 35, 12.3 A
IPC ............... B60H 1/22,1/03; B64D 13/08; F28D 7/10, 7/12; F24H 1/12, 3/08
See application file for complete search history.

(56) References Cited

U.S. PATENT DOCUMENTS

| | | | | |
|---|---|---|---|---|
| 2,610,796 | A * | 9/1952 | Marshall, Jr. | B60H 1/2209 236/20 R |
| 3,543,742 | A * | 12/1970 | Frankle | B60H 1/2212 126/110 B |
| 3,894,526 | A * | 7/1975 | Kofink | F24H 3/065 126/110 B |
| 3,989,029 | A * | 11/1976 | Friedl | B60H 1/22 126/110 B |
| 3,989,030 | A * | 11/1976 | Friedl | B60H 1/2212 126/110 R |
| 4,142,580 | A * | 3/1979 | Bailey | F28D 7/12 122/181 |
| 4,216,759 | A * | 8/1980 | Friedl | B60H 1/2212 126/110 B |
| 4,350,288 | A * | 9/1982 | Hermann | B60H 1/2206 126/110 B |
| 4,395,225 | A * | 7/1983 | Mittmann | B60H 1/2203 236/96 |
| 4,519,772 | A * | 5/1985 | Mittmann | B60H 1/2206 237/12.3 C |
| 4,590,888 | A * | 5/1986 | Mosig | F24H 1/263 122/135.3 |
| 4,624,218 | A * | 11/1986 | Bauml | B60H 1/2209 122/136 C |
| 4,637,371 | A | 1/1987 | Räthel | |
| 4,640,262 | A * | 2/1987 | Lucius | F23D 11/404 126/110 B |
| 4,718,602 | A | 1/1988 | Beck et al. | |
| 4,923,033 | A * | 5/1990 | Panick | B60H 1/2212 126/116 R |
| 5,056,501 | A * | 10/1991 | Ida | B60H 1/2212 126/110 B |
| 5,143,152 | A * | 9/1992 | Catelli | F28D 7/103 165/154 |
| 5,205,250 | A * | 4/1993 | Easterly | F02N 19/10 123/142.5 R |
| 5,219,535 | A * | 6/1993 | Giacobbe | B01J 8/062 165/142 |
| 5,542,467 | A * | 8/1996 | Carpentier | F28D 7/12 165/142 |
| 5,738,506 | A * | 4/1998 | Mosig | B60H 1/2203 237/12.3 C |
| 5,788,148 | A * | 8/1998 | Burner | B60H 1/2206 236/21 B |
| 6,006,997 | A * | 12/1999 | Pfister | B60H 1/2206 236/78 D |
| 6,082,625 | A * | 7/2000 | Faccone | B60H 1/032 237/12.3 C |
| 6,089,465 | A | 7/2000 | Habijanec et al. | |
| 6,364,212 | B1 * | 4/2002 | Widemann | B60H 1/2206 237/12.3 C |
| 6,932,151 | B2 * | 8/2005 | Galtz | B60H 1/2209 165/142 |
| 7,434,746 | B2 * | 10/2008 | Schlecht | B60H 1/2203 165/41 |
| 8,910,881 | B2 * | 12/2014 | Ludwig | B60H 1/2212 237/12.3 A |
| 9,290,079 | B2 * | 3/2016 | Collmer | F23C 3/00 |
| 2001/0050166 | A1 * | 12/2001 | Carpentier | F28D 9/0006 165/176 |
| 2002/0117551 | A1 * | 8/2002 | Wolf | B60H 1/2212 237/12.3 C |
| 2003/0173413 | A1 * | 9/2003 | Schlecht | B60H 1/2212 237/12.3 C |
| 2004/0079516 | A1 * | 4/2004 | Leeson | B63H 21/10 165/44 |
| 2006/0151623 | A1 * | 7/2006 | Haefner | F24H 3/065 237/12.3 C |
| 2012/0205066 | A1 | 8/2012 | Humburg | |
| 2012/0286053 | A1 * | 11/2012 | Galtz | B60H 1/2209 237/33 |
| 2013/0015255 | A1 * | 1/2013 | Collmer | F23C 3/00 237/32 |
| 2014/0131461 | A1 * | 5/2014 | Humburg | F28D 7/103 237/12.3 C |
| 2014/0134559 | A1 * | 5/2014 | Humburg | F24H 1/263 432/247 |

FOREIGN PATENT DOCUMENTS

| | | | | |
|---|---|---|---|---|
| DE | 33 41 490 | A1 | 5/1985 | |
| DE | 3807190 | A1 * | 9/1989 | .......... F24H 9/1836 |
| DE | 3839243 | A1 * | 5/1990 | .......... G10K 11/172 |
| DE | 19509780 | C1 * | 8/1996 | .......... B60H 1/2209 |
| DE | 10051755 | C1 * | 4/2002 | .......... B60H 1/2209 |
| DE | 101 43 479 | C1 | 1/2003 | |
| DE | 10207953 | B4 | 5/2005 | |
| DE | 10 2011 004 159 | A1 | 8/2012 | |
| DE | 10 2011 081 401 | A1 | 2/2013 | |
| EP | 0 916 908 | B1 | 4/2004 | |
| EP | 2 489 534 | A1 | 8/2012 | |
| JP | 53030545 | A * | 3/1978 | |
| JP | 61188216 | A * | 8/1986 | |
| JP | 62293087 | A * | 12/1987 | |
| JP | 62293088 | A * | 12/1987 | |
| JP | 62294847 | A * | 12/1987 | |
| JP | 63096491 | A * | 4/1988 | |
| JP | 63096493 | A * | 4/1988 | |
| JP | 03079424 | A * | 4/1991 | |
| JP | DE 4029041 | A1 * | 4/1991 | .......... F04D 23/008 |
| JP | 08258542 | A * | 10/1996 | |
| JP | 2002205531 | A * | 7/2002 | |
| JP | 2003237353 | A * | 8/2003 | |
| JP | 2004268886 | A * | 9/2004 | |
| JP | 2008296910 | A | 12/2008 | |

* cited by examiner

HEAT EXCHANGER ARRANGEMENT, ESPECIALLY FOR A VEHICLE HEATER

CROSS REFERENCE TO RELATED APPLICATIONS

This application claims the benefit of priority under 35 U.S.C. §119 of German Patent Application DE 10 2012 220 792.9 filed Nov. 14, 2012, the entire contents of which are incorporated herein by reference.

FIELD OF THE INVENTION

The present invention pertains to a heat exchanger arrangement, especially for a vehicle heater, comprising a pot-like (pot-shaped) heat exchanger housing extending in the direction of a longitudinal axis of the housing with an outer wall and with an inner wall, wherein a heat carrier medium flow space is formed between the outer wall and the inner wall, wherein at least one heat carrier medium flow connecting space that is open towards the heat carrier medium flow space is provided at the outer wall and wherein a waste gas flow connecting piece open towards an interior space of the heat exchanger housing, which said interior space is surrounded by the interior wall, is provided at the heat exchanger housing, wherein the heat exchanger housing comprises an outer housing part with an outer circumferential wall and with an outer bottom wall as well as an inner housing part with an inner circumferential wall and with an inner bottom wall.

BACKGROUND OF THE INVENTION

A heat exchanger arrangement for a vehicle heater, which has a heat exchanger housing of an essentially pot-like design, is known from EP 0 916 908 B1. An outer housing part of this heat exchanger housing is provided with an outer circumferential wall and with an outer bottom wall. An inner housing part of the pot-like heat exchanger housing has an inner circumferential wall and an inner bottom wall and is inserted into the outer housing part, so that it defines, together with this, a heat carrier medium flow space. At the end area of the inner housing part located at a distance from the outer bottom wall or the inner bottom wall, said inner housing part is provided with an essentially ring-shaped outer circumferential wall section, which surrounds the inner circumferential wall, is connected to the inner circumferential wall in the axial end area thereof and to which the outer circumferential wall of the outer housing part is connected in a fluid-tight manner. This outer circumferential wall section defines, together with the section of the inner circumferential wall located in the same axial area relative to a longitudinal axis of the pot-like heat exchanger housing, a ring-like intermediate space, which provides a part of the heat carrier medium flow space and is not closed in the radially outward direction by the outer circumferential wall of the outer housing part.

A waste gas flow connecting piece is provided at the inner housing part in the axial area of the outer circumferential wall section, i.e., in the axial area in which the ring-like intermediate space forming one part of the heat carrier medium flow space is formed. This waste gas flow connecting piece passes through the ring-like intermediate space and is open through the inner circumferential wall defining the ring-like intermediate space in the radially inward direction towards an interior space of the heat exchanger housing, which said interior space is surrounded by the inner wall. In case of integration in a vehicle heater, combustion waste gases flow through this interior space of the heat exchanger housing, so that the inner heat exchanger housing can absorb heat from the combustion waste gases and can transfer this to heat carrier medium flowing in the heat carrier medium flow space, i.e., for example, water. The combustion waste gases leave this interior space through the waste gas flow connecting piece passing through the ring-like intermediate space between the outer circumferential wall section and the inner circumferential wall.

Heat carrier flow connecting pieces, which are open towards the heat carrier medium flow space and thus make possible the feeding and removal of heat carrier medium into and from the heat carrier medium flow space, are provided at the outer circumferential wall of the outer housing part where the latter adjoins the outer bottom wall. The heat carrier medium flow connecting pieces are located, for example, in the same circumferential area as the waste gas flow connecting piece provided at the inner housing part.

SUMMARY OF THE INVENTION

An object of the present invention is to provide a heat exchanger arrangement, especially for a vehicle heater, which has a simple design and can be manufactured in a simple manner.

This object is accomplished according to the present invention by a heat exchanger arrangement, especially for a vehicle heater, comprising a pot-like pot-like (pot-shaped) heat exchanger housing extending in the direction of a longitudinal axis of the housing, with an outer wall and with an inner wall, wherein a heat carrier medium flow space is formed between the outer wall and the inner wall, wherein at least one heat carrier medium flow connecting piece open towards the heat carrier medium flow space is provided between the outer wall and the inner wall, wherein at least one heat carrier medium flow connecting piece open towards the heat carrier medium flow space is provided at the outer wall, and wherein at least one heat carrier medium flow connecting piece open towards the heat carrier medium flow space is provided at the heat exchanger housing, and wherein a waste gas flow connecting piece open towards an interior space of the heat exchanger housing, which said interior space is surrounded by the inner wall, is provided at the heat exchanger housing, wherein the heat exchanger housing comprises an outer housing part with an outer circumferential wall and with an outer bottom wall as well as an inner housing part with an inner circumferential wall and with an inner bottom wall.

Provisions are, furthermore, made for at least one heat carrier medium flow connecting piece to be provided at an axial end area of the outer circumferential wall of the outer housing part, which said end area is located at a distance from the outer bottom wall.

The at least one heat carrier medium flow connecting piece is provided in the design of a heat exchanger arrangement according to the present invention in an axial area of the outer circumferential wall, which said area is located close to the open end of the outer housing part, which is generally also provided with a pot-like structure, and is thus readily accessible during the manufacturing process. Since such housing parts are manufactured, in general, according to a casting method and casting molds must therefore be inserted one into the other, it is easily possible, by providing the at least one heat carrier medium flow connecting piece at the axial end area of the outer circumferential wall located at a distance from the outer bottom wall, to provide the heart carrier medium flow connecting piece as an integral part of the outer housing part and to separate the mold parts necessary for this in a simple manner after performing the casting operation.

To make it possible to generate a reliable flow through the heat carrier medium flow space, it is proposed that two heat carrier medium flow connecting pieces be provided at the outer circumferential wall in essentially the same axial area of the outer circumferential wall at circumferentially spaced locations from one another. One of the flow connecting pieces can then be used to feed heat carrier medium and the other to remove the heat carrier medium.

Since the outer housing part and the inner housing part are to be inserted one into the other to provide the pot-like heat exchanger housing, it is especially advantageous if the at least one heat carrier medium flow connecting piece and the waste gas flow connecting piece are provided in the same axial area of the heat exchanger housing by the circumferential distance. The two housing parts are thus prevented from mutually interfering with one another when they are pushed one into the other. At the same time, a connection area is provided at the heat exchanger arrangement in an axial area, which makes possible a compact accommodation, for example, in a vehicle, with easy access for pipes to be connected.

To make it possible to provide the heat carrier medium flow space enclosed by the outer circumferential wall of the outer housing part with a comparatively large volume, taking into account the fact that the waste gas flow connecting piece is provided at the inner housing part, it is proposed that the outer circumferential wall be formed with a greater length of extension from the outer bottom wall in a first circumferential area of the outer circumferential wall and with a shorter length of extension from the outer bottom wall in a second circumferential area of the outer circumferential wall, wherein the at least one heat carrier medium flow connecting piece is provided in the area of the first circumferential area. Provisions may be made for this, for example, for the outer circumferential wall to end obliquely in relation to the longitudinal axis of the housing in its axial end area located at a distance from the outer bottom wall. A stepped transition between the circumferential areas with different lengths of extension beginning from the outer bottom wall would, of course, also be possible as an alternative.

A casting operation can then be carried out in an especially simple manner with the use of corresponding casting molds for providing a heat carrier medium flow connecting piece designed integrally with the outer circumferential wall if the at least one heat carrier medium flow connecting piece is provided essentially entirely in an area of the outer circumferential wall projecting axially over the second circumferential area of the outer circumferential wall in the first circumferential area.

To make it possible to define the heat carrier medium flow space in the axial direction by the inner housing part and the inner circumferential wall thereof such that sufficient space is provided at the inner housing part for providing the waste gas flow connecting piece, it is proposed that a front surface defining the heat carrier medium flow space in the axial direction be provided at the inner circumferential wall of the inner housing part, wherein the front surface has a greater axial distance from the inner bottom wall in a first circumferential area of the inner circumferential wall and has a shorter axial distance from the inner bottom wall in a second circumferential area of the inner circumferential wall. The front surface may be arranged obliquely, for example, in relation to the longitudinal axis of the housing. As an alternative, a stepped transition between the areas of different axial distances from the inner bottom wall could be provided here as well. The outer housing part may be connected in the area of the front surface with the inner housing part, and the waste gas flow connecting piece is preferably provided at the inner circumferential wall in the area of the second circumferential area of the inner circumferential wall, i.e., where a sufficient axial space is provided at the inner housing part by a corresponding axial definition of the heat carrier medium flow space to provide an opening leading to the interior space of the heat exchanger housing.

The front surface may be provided at the inner circumferential wall by a preferably step-like increase in the thickness thereof, and a vertical step may advantageously, but not necessarily, be formed here. A curved transition into the front surface or an area of a greater thickness of the inner circumferential wall may also be provided for providing an increase in thickness and hence to provide the front surface.

The heat exchanger arrangement according to the present invention is connected, in general, with other assembly units, especially a burner area, at the axial end area of the pot-like heat exchanger housing, which said end area is located at a distance from the bottom walls of the two housing parts. To make it possible to provide a fluid-tight closure against the discharge of waste gases there in a simple manner, it is proposed that the inner circumferential wall end essentially at right angles to the longitudinal axis of the housing in its axial end area located at a distance from the inner bottom wall.

It is proposed in an embodiment that is especially advantageous for manufacturing reasons that the heat carrier medium flow space be defined in the radial outwardly directly essentially only by the outer circumferential wall of the outer housing part. Consequently, no undercut areas need to be provided now on the inner housing part in order to define a part of the heat carrier medium flow space solely by the inner housing part, similar to the way it is done in the state of the art cited in the introduction by providing an outer circumferential wall section at the inner housing part. Thus, unlike in the state of the art, the waste gas flow connecting piece does not pass through the annular space formed at the inner heat exchanger housing, but it is located outside the heat carrier medium flow space. This possibly leads to a reduction of the efficiency of heat transfer, but it makes possible a substantially simpler manufacture of the inner housing part with the waste gas flow connecting piece provided thereon integrally according to a casting method.

As was already described above, provisions can be made by the design of the heat exchanger housing according to the present invention in an especially simple manner for the outer housing part to be formed integrally with the at least one heat carrier medium flow connecting piece or/and for the inner housing part to be formed integrally with the waste gas flow connecting piece.

Essentially only the inner housing part comes into contact with the comparatively hot combustion waste gases in the case of the design according to the present invention. It is advantageous for this reason to provide this [inner housing part] as a die-cast metal part, made, for example, from aluminum material. The outer housing part is not exposed, in general, to such high temperatures, so that this can be advantageously manufactured as an injection-molded plastic part for cost reasons and for weight reduction.

The present invention pertains, furthermore, to a vehicle heater, comprising a burner area to be supplied with fuel and combustion air and a heat exchanger arrangement in accordance with the invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
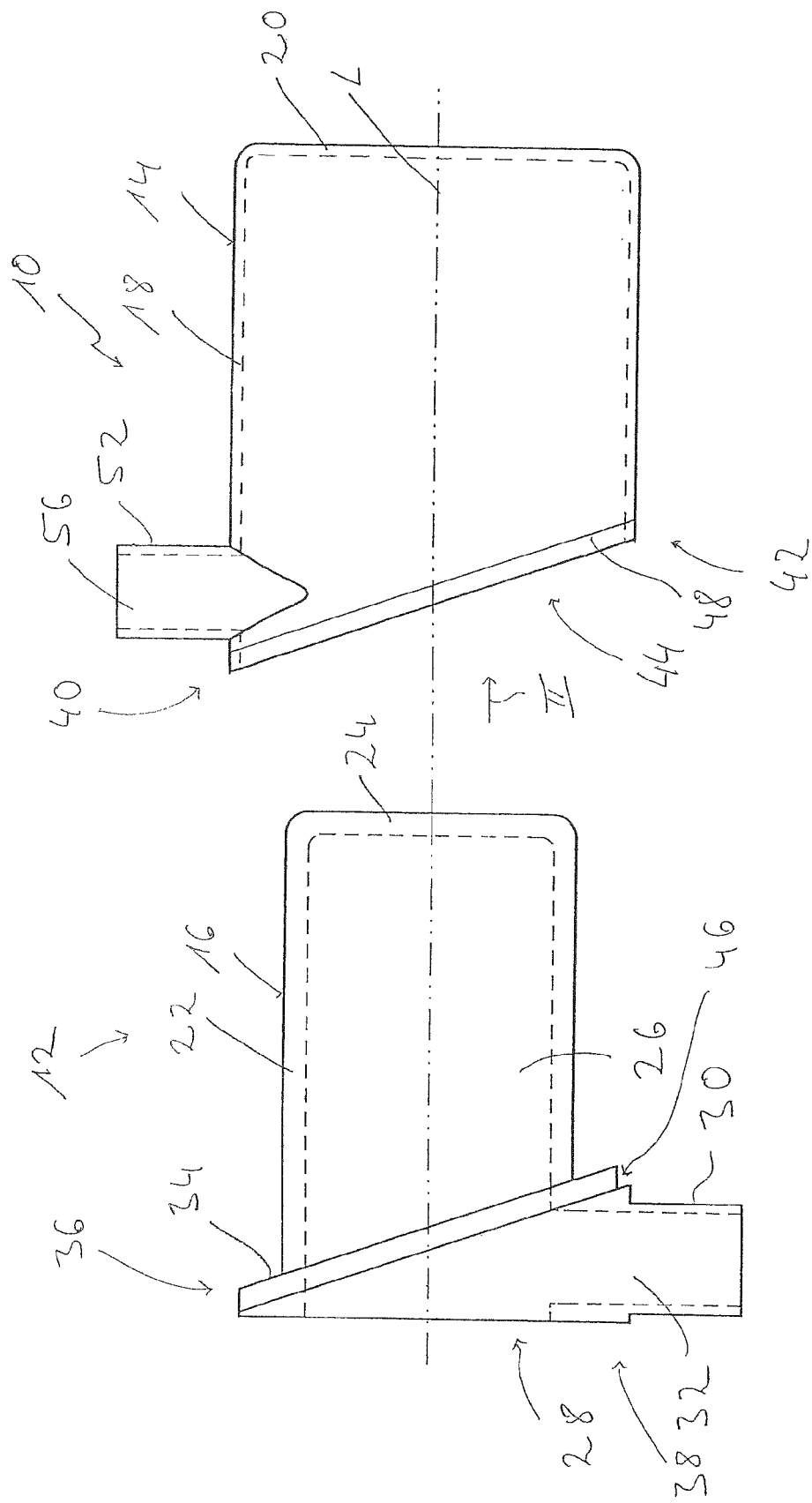
FIG. 1 is an exploded side view showing a pot-like heat exchanger housing with an outer housing part and with an inner housing part according to the invention.

Referring to the drawings in particular, a heat exchanger housing of a heat exchanger arrangement 10, which heat exchanger housing is shown in an exploded view, is designated by 12 in FIG. 1. The heat exchanger housing 12 designed as a housing extending with a pot-like structure along a longitudinal axis L of the housing comprises an outer housing part 14 as well as an inner housing part 16. The outer housing part 14 and the inner housing part 16 are likewise provided each with an essentially pot-like (pot-shaped) structure.

The outer housing part 14 comprises an outer circumferential wall 18, which is also indicated by broken line in FIG. 1, and an outer bottom wall 20. The inner housing part 16 likewise comprises, likewise indicated by broken line, an inner circumferential wall 22 and an inner bottom wall 24. The inner housing part 16 is inserted into the outer housing part 14 in the assembled state of the heat exchanger housing 12 and defines, together with this, a heat carrier medium flow space. The inner housing part 16 encloses an interior space 26 of the heat exchanger housing 12, into which a flame tube originating from a burner area extends in case such a heat exchanger arrangement 10 is integrated, for example, into a vehicle heater. The combustion waste gases generated during the combustion operation flow through the flame tube towards the inner bottom wall 24 and are deflected there radially outwardly in relation to the longitudinal axis L of the housing. They then flow between the flame tube, not shown in FIG. 1, and the inner circumferential wall 22 back to an axial end area 28 of the inner circumferential wall 22, which said end area is located at a distance from the inner bottom wall 24. The inner housing part 16 or the inner circumferential wall 22 ends in this end area 28 essentially at right angles to the longitudinal axis L of the housing, so that the inner housing part 16 or the heat exchanger arrangement 10 can be connected, for example, to the burner area of a vehicle heater in a simple manner to bring about a tight closure of the waste gas flow space. The combustion waste gases leave the interior space 26 through a waste gas outlet opening 32, which passes through the inner circumferential wall 22 and is also formed in a waste gas flow connecting piece 30.

A front surface 34 defining the heat carrier medium flow space in the axial area located at a distance from the two bottom walls 20, 24 is provided at the inner housing part 16 or the inner circumferential wall 22 thereof close to the axial end area 28. This front surface 34 may be provided, for example, by a stepped increase in the thickness of the inner circumferential wall 22. It is clearly recognized in FIG. 1 that the front surface 34, which surrounds the longitudinal axis L of the housing in an essentially ring-shaped manner, is positioned obliquely in relation to the longitudinal axis L of the housing, so that the front surface 34 assumes a generally elliptical configuration in case of a generally round shape of the inner circumferential wall 22 in the area of its outer circumferential surface. As is shown in FIG. 1, the front surface 34 may be essentially flat, i.e., located in a plane positioned obliquely in relation to the longitudinal axis L of the housing. It is also possible to set the front surface 34 at an angle or to set it partially at an angle in relation to such a plane; for example, a conical design of the front surface 34 is possible. Regardless of whether the front surface is flat or is set, for example, conically at an angle or whether it is possibly curved, the basic arrangement of said front surface is such that it is positioned obliquely in relation to the longitudinal axis L of the housing with its structure generally extending about the longitudinal axis L of the housing in a ring-shaped manner.

The oblique positioning of the front surface 34 in relation to the longitudinal axis L of the housing leads to such a configuration that the front surface 34 has a greater axial distance from the inner bottom wall 24 in a first circumferential area 36 of the inner circumferential wall 16 than in a second circumferential area 38 located essentially diametrically opposite the first circumferential area 36 of the inner circumferential wall 22 in relation to the longitudinal axis L of the housing. The area of the inner housing part 26 generated by the increase in the thickness of the inner circumferential wall 22 thus assumes a generally wedge-shaped configuration in the side view recognizable in FIG. 1.

Corresponding to this oblique position of the front surface 34 axially defining the heat carrier medium flow space at the inner housing part 16, the outer circumferential wall 18 of the outer housing part 14 is designed such that it has a greater axial extension starting from the outer bottom wall 22 in a first circumferential area 40 of the outer circumferential wall 18 than in a second circumferential area 42 of the outer circumferential wall 18, which said second circumferential area 42 is located essentially diametrically opposite the first circumferential area 40 of the outer circumferential wall 18. This means that the outer circumferential wall 18 ends obliquely in its axial end area 44 that is located at a distance from the outer bottom wall 20, and essentially the same slope angle is provided here in relation to the longitudinal axis L of the housing as in the case of the front surface 34. In the assembled state, the outer circumferential wall 18 with its axial end area 44 adjoins the inner circumferential wall 22 in the area of the increased thickness formed thereon or of the increase in the outer circumferential dimension to provide the front surface 34. A connection step 46, over which the outer circumferential wall 18 of the outer housing part 14 can be pushed to generate a defined relative positioning or centering of the two housing parts 14, 16 in relation to one another, may be formed for this axially adjoining the front surface. The two housing parts 14, 16 may be advantageously connected by material connection, for example, by bonding, as a result of which a fluid-tight closure of the heat carrier medium flow space enclosed by the two housing parts 14 and 16 is also formed at the same time. Corresponding to the connection step 46 at the inner circumferential wall 22, a complementary connection step 48 may be formed on the outer housing part 18, which can contribute to an enlarged connection surface and to an additional labyrinth-like sealing configuration.

It is achieved with the above-described design that the heat carrier medium flow space formed between the two housing parts 14, 16 is defined radially inwardly exclusively by the inner circumferential wall 22, namely, with the section thereof adjoining the front surface 34 and extending up to the inner bottom wall 24; that the heat carrier medium flow space is defined, furthermore, in the axial direction at the axial end area located at a distance from the two bottom walls 20, 24 exclusively by the inner housing part 16, namely, by the front surface 34 provided by a radial expansion of the inner circumferential wall 22; and that the heat carrier medium flow space is defined radially on the outside essentially exclusively by the outer circumferential wall 18 of the outer housing part 14. Thus, undercut areas, which areas of the inner housing part 16 define the heat carrier medium flow space in the radially outward direction in relation to the longitudinal axis L of the housing, are not necessarily formed on the inner housing part 16, which markedly simplifies the manufacturing process according to a casting method. It shall also be stated that the provision of such undercut areas, for example, close to the first circumferential area 36 of the inner circumferential wall 22 shall not be ruled out, for example, insofar as this is advantageous for reasons of flow routing. However, the radially expanded area of the inner circumferential wall 22 adjoining the front surface 34 is for the most part free from such undercuts, so that, as this will be explained below, the waste gas flow connecting piece 30 is, indeed, also located outside the heat carrier medium flow space, i.e., it does not pass though same.

This positioning of the waste gas flow connecting piece 30 can be obtained, as this is clearly visible in FIG. 1, by the waste gas flow connecting piece 30 being positioned in the second circumferential area 38 of the inner circumferential wall 22, i.e., in an area that is located outside the heat carrier medium flow space at least in this circumferential area of the entire heat exchanger arrangement 10.

Figure 2:
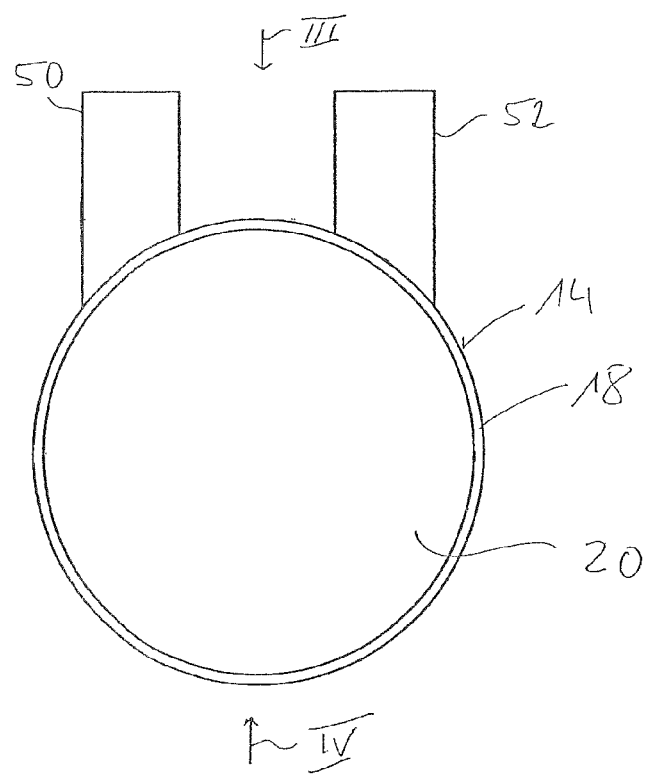
FIG. 2 is a view showing the outer housing part in direction of view II in FIG. 1.
Figure 3:
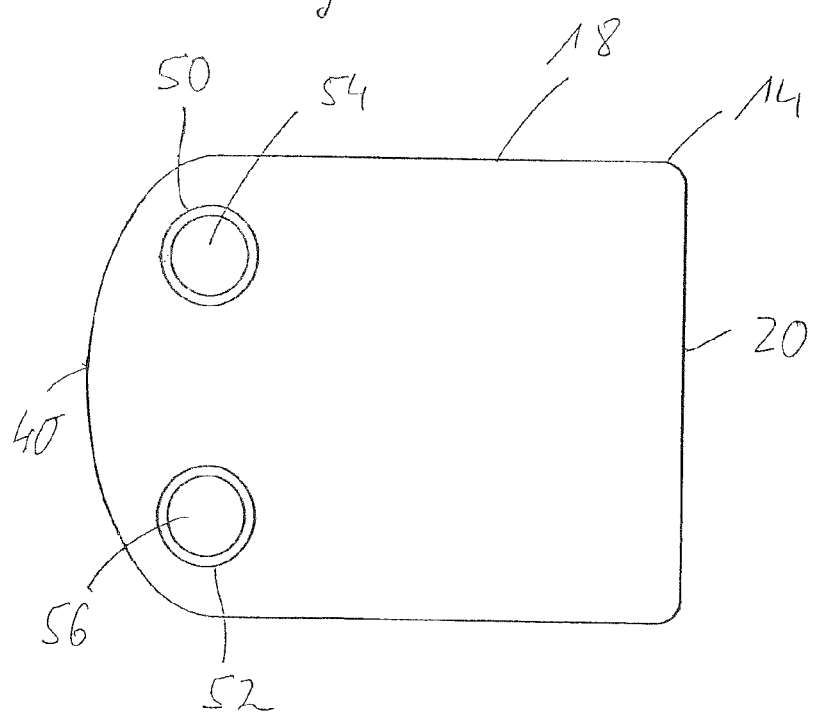
FIG. 3 is a view showing the outer housing part in direction of view III in FIG. 2.

Two heat carrier medium flow connecting pieces 50, 52, which can also be recognized in FIGS. 2 and 3, are provided at the outer housing part 14 for supplying heat carrier medium into the heat carrier medium flow space. These form openings 54, 56 leading each to the heat carrier medium flow space and may be connected to respective pipes for feeding, for example, liquid heat carrier medium to the heat carrier medium flow space and for removing heat carrier medium from the heat carrier medium flow space. The two heat carrier medium flow connecting pieces may extend here advantageously essentially in parallel with one another with a circumferential distance beginning and away from the outer circumferential wall 18.

Figure 4:
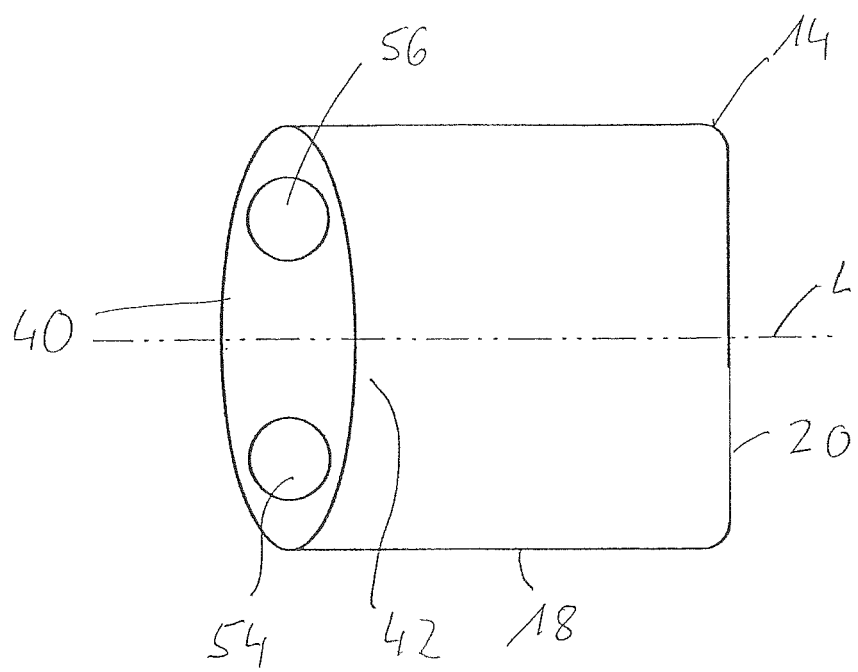
FIG. 4 is a view showing the outer housing part in direction of view IV in FIG. 2.

The two heat carrier medium flow connecting pieces 50, 52 are provided at the outer circumferential wall 18 in the area of the first circumferential area 40 thereof, i.e., in an area in which the outer circumferential wall 18 has a comparatively great length of extension starting from the outer bottom wall 20. The two heat carrier medium flow connecting pieces 50, 52 are advantageously located in an axial area of the outer circumferential wall 18 in the first circumferential area 40 thereof, which extends axially essentially fully over the second circumferential area 42 of the outer circumferential wall 18, which said second circumferential area is located diametrically opposite in relation to the longitudinal axis L of the housing. This causes the two openings 54, 56 not to be covered axially by the area of the outer circumferential wall 18, which said area is located opposite in relation to the longitudinal axis L of the housing, in the side view shown in FIG. 4. It is thus possible in a very simple manner during the manufacture of the outer housing part 14 according to the casting method to insert casting mold parts and to remove such casting mold after the casting operation had been carried out, such casting mold parts being necessary to provide the openings 54, 56 and the heat carrier medium flow connecting pieces 50, 52 that also enclose these.

In the assembled state of the two housing parts 14, 16, the two heat carrier medium flow connecting pieces 50, 52 are located with their openings 54, 56 in a circumferential area of the heat exchanger housing 12, which is located opposite or diametrically opposite the circumferential area in which the waste gas flow connecting piece 30 is located in relation to the longitudinal axis L of the housing. Due to the circumstance that the outer housing part 14 ends obliquely in its axial end area 44, the two heat carrier medium flow connecting pieces 50, 52 are located in the assembled state in essentially the same axial area as the waste gas flow connecting piece 30 formed on the inner housing part 16. Essentially in the same axial area means here that the heat carrier medium flow connecting pieces 50, 52 and the waste gas flow connecting piece 30 overlap in the axial direction at least in some areas, preferably with the larger part of their axial extension. Due to the circumstance that these two types of connecting pieces are provided in different circumferential positions of the heat exchanger housing 12, this is possible without problems. Thus, a connection area, in which pipes for supplying and removing the heat carrier medium can be connected, on the one hand, and a pipe of a waste gas routing system can be connected, on the other hand, is thus formed at the heat exchanger housing 12 at an axially spaced location from the two bottom walls 20, 24.

It becomes easily possible with the design according to the present invention to manufacture the two housing parts 14, 16 with the connecting pieces 30 and 50, 52 provided integrally thereon according to a casting method. The inner housing part 16 can be manufactured according to a metal die-casting method, for example, with aluminum material, so that the comparatively high waste gas temperatures cannot damage this inner housing part 16. The outer housing part 14 exposed to a lower thermal load may be manufactured from a plastic material according to an injection molding method.

While specific embodiments of the invention have been shown and described in detail to illustrate the application of the principles of the invention, it will be understood that the invention may be embodied otherwise without departing from such principles.

What is claimed is:
1. A heat exchanger arrangement for a vehicle heater, the heat exchanger arrangement comprising:
a pot-shaped heat exchanger housing extending in a direction of a longitudinal axis of the housing, the heat exchanger housing comprising an outer housing part with an outer circumferential wall and with an outer bottom wall and an inner housing part with an inner circumferential wall and with an inner bottom wall, wherein a heat carrier medium flow space is formed between the outer housing part and the inner housing part, a heat carrier medium flow connecting piece, open towards the heat carrier medium flow space, provided at the outer wall, the heat carrier medium flow connecting piece being provided at an axial end area of the outer circumferential wall of the outer housing part, which said end area is located at a distance from the outer bottom wall;

another heat carrier medium flow connecting piece, such that two heat carrier medium flow connecting pieces are provided at the outer circumferential wall in essentially a same axial area of the outer circumferential wall at circumferentially spaced locations from one another; and a waste gas flow connecting piece, open towards an interior space of the heat exchanger housing, which said interior space is surrounded by the inner walls of the inner housing part, wherein:

the outer circumferential wall is formed with a greater axial length of extension from the outer bottom wall in a first circumferential area of the outer circumferential wall;

the outer circumferential wall is provided with a shorter axial length of extension from the outer bottom wall in a second circumferential area of the outer circumferential wall, said shorter axial length of extension being shorter than said greater axial length of extension;

the heat carrier medium flow connecting pieces are provided in the first circumferential area; and the waste gas flow connecting piece is provided on the inner housing part in a circumferential area corresponding to the second circumferential area of the outer circumferential wall.

2. A heat exchanger arrangement in accordance with claim 1, wherein the heat carrier medium connecting piece and the waste gas flow connecting piece are provided in essentially the same axial area of the heat exchanger housing at circumferentially spaced locations from one another.

3. A heat exchanger arrangement in accordance with claim 2, wherein:
the waste gas flow connecting piece is provided adjacent to the second circumferential area;
the inner housing part has a greatest axial length of extension from the adjacent second circumferential area to an inner housing axial end area.

4. A heat exchanger arrangement in accordance with claim 1, wherein the outer circumferential wall ends obliquely in the axial end area located at a distance from the outer bottom wall in relation to the longitudinal axis of the housing.

5. A heat exchanger arrangement in accordance with claim 1, wherein the heat carrier medium flow connecting piece is provided essentially entirely in an area of the outer circumferential wall extending axially over the second circumferential area of the outer circumferential wall in the first circumferential area.

6. A heat exchanger arrangement in accordance with claim 1, wherein:
a front surface, defining the heat carrier medium flow space in the axial direction, is provided at the inner circumferential wall of the inner housing part; and
the front surface has a greater axial distance from the inner bottom wall in a first circumferential area of the inner circumferential wall and a shorter axial distance from the inner bottom wall in a second circumferential area of the inner circumferential wall.

7. A heat exchanger arrangement in accordance with claim 6, wherein the front surface is arranged obliquely in relation to the longitudinal axis of the housing.

8. A heat exchanger arrangement in accordance with claim 6, wherein the outer housing part is connected to the inner housing part in the area of the front surface.

9. A heat exchanger arrangement in accordance with claim 6, wherein the waste gas flow connecting piece is provided at the inner circumferential wall in the area of the second circumferential area of the inner circumferential wall.

10. A heat exchanger arrangement in accordance with claim 6, wherein the inner circumferential wall has a stepped increase in thickness to provide the front surface.

11. A heat exchanger arrangement in accordance with claim 1, wherein the inner circumferential wall ends essentially at right angles to the longitudinal axis of the housing in axial end area located at a distance from the inner bottom wall.

12. A heat exchanger arrangement in accordance with claim 1, wherein the heat carrier medium flow space is defined in the radially outward direction essentially only by the outer circumferential wall of the outer housing part.

13. A heat exchanger arrangement in accordance with claim 1, wherein at least one of:
the outer housing part is made integrally with the carrier medium flow connecting piece; and
the inner housing part is made integrally with the waste gas flow connecting piece.

14. A heat exchanger arrangement in accordance with claim 1, wherein at least one of:
the outer housing part comprises an injection-molded plastic part; and
the inner housing part comprises a die-cast metal part.

15. A vehicle heater comprising:
a burner area to be fed with fuel and combustion air; and
a heat exchanger arrangement comprising:
a pot-shaped heat exchanger housing extending in a direction of a longitudinal axis of the housing, the heat exchanger housing comprising an outer housing part with an outer circumferential wall and with an outer bottom wall and an inner housing part with an inner circumferential wall and with an inner bottom wall, wherein a heat carrier medium flow space is formed between the outer walls and the inner walls;
a heat carrier medium flow connecting piece, open towards the heat carrier medium flow space, provided at the outer wall, the heat carrier medium flow connecting piece being provided at an axial end area of the outer circumferential wall of the outer housing part, which said end area is located at a distance from the outer bottom wall; and
a waste gas flow connecting piece, open towards an interior space of the heat exchanger housing, which said interior space is surrounded by the inner wall, wherein:
the outer circumferential wall is formed with a greater axial length of extension from the outer bottom wall in a first circumferential area of the outer circumferential wall;
the outer circumferential wall is provided with a shorter axial length of extension from the outer bottom wall in a second circumferential area of the outer circumferential wall, said shorter axial length of extension being shorter than said greater axial length of extension;
the heat carrier medium flow connecting piece is provided in the first circumferential area; and
the waste gas flow connecting piece is provided on the inner housing part in a connecting piece circumferential area corresponding, with respect to a circumference of the heat exchanger housing, to the second circumferential area of the outer circumferential wall.

16. A vehicle heater in accordance with claim 15, further comprising another heat carrier medium flow connecting piece, such that two heat carrier medium flow connecting pieces are provided at the outer circumferential wall in essentially a same axial area of the outer circumferential wall at circumferentially spaced locations from one another.

17. A vehicle heater in accordance with claim 15, wherein the heat carrier medium connecting piece and the waste gas flow connecting piece are provided in essentially the same axial area of the heat exchanger housing at circumferentially spaced locations from one another.

18. A vehicle heater in accordance with claim 17, wherein:
   the waste gas flow connecting piece is provided adjacent to the second circumferential area;
   the waste gas flow connecting piece circumferential area has an inner housing greatest axial length of extension from the adjacent second circumferential area to an inner housing axial end area.

19. A vehicle heater in accordance with claim 15, wherein:
   a front surface, defining the heat carrier medium flow space in the axial direction, is provided at the inner circumferential wall of the inner housing part; and
   the front surface has a greater axial distance from the inner bottom wall in a first circumferential area of the inner circumferential wall and a shorter axial distance from the inner bottom wall in a second circumferential area of the inner circumferential wall.

* * * * *